(12) United States Patent
Zeng

(10) Patent No.: US 7,046,393 B2
(45) Date of Patent: May 16, 2006

(54) COLOR SPACE TRANSFORMATION WITH BLACK PRESERVATION FOR OPEN COLOR MANAGEMENT

(75) Inventor: Huanzhao Zeng, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 881 days.

(21) Appl. No.: 09/843,406

(22) Filed: Apr. 26, 2001

(65) Prior Publication Data

US 2002/0159081 A1    Oct. 31, 2002

(51) Int. Cl.
   *G06F 15/00* (2006.01)
(52) U.S. Cl. .................. 358/1.9; 358/3.23; 358/518; 358/1.15; 358/501; 358/529; 382/162; 382/167; 345/604; 345/602; 345/589
(58) Field of Classification Search .............. 358/1.9, 358/3.23, 5, 18, 1.15, 1.16, 1.17, 529, 501; 382/162, 166, 167, 224; 345/604, 602, 600, 345/589; 347/9; 705/26
See application file for complete search history.

(56) References Cited

U.S. PATENT DOCUMENTS

| | | | | |
|---|---|---|---|---|
| 5,319,473 | A * | 6/1994 | Harrington ............... | 358/501 |
| 5,726,778 | A * | 3/1998 | Tanio ........................ | 358/501 |
| 6,061,501 | A | 5/2000 | Decker et al. | |
| 6,088,038 | A * | 7/2000 | Edge et al. ............... | 345/600 |
| 6,268,930 | B1 * | 7/2001 | Ohta et al. ................ | 358/1.9 |
| 6,424,352 | B1 * | 7/2002 | Sharma et al. ............ | 345/602 |
| 6,430,311 | B1 * | 8/2002 | Kumada .................... | 382/162 |
| 6,434,272 | B1 * | 8/2002 | Saarelma .................. | 382/224 |
| 6,466,334 | B1 * | 10/2002 | Komiya et al. ........... | 358/1.9 |
| 6,480,299 | B1 * | 11/2002 | Drakopoulos et al. .... | 358/1.9 |
| 6,595,612 | B1 * | 7/2003 | Brown et al. ............. | 347/9 |
| 6,633,668 | B1 * | 10/2003 | Newman ................... | 382/166 |

(Continued)

FOREIGN PATENT DOCUMENTS

EP          1079606          2/2001

(Continued)

OTHER PUBLICATIONS

T.J. Cholewo. Conversion Betweeen CMYK Spaces Preserving Black Separation. In IS&T/SID's Eighth Color Imaging Conference: Color Science and Engineering Systems, Technologies, Applications, pp. 257-261, Scottsdale, Arizona, Nov. 2000.

(Continued)

*Primary Examiner*—Mark Wallerson
*Assistant Examiner*—Beniyam Menberu

(57) ABSTRACT

An open color management system allows any of a plurality of input color devices to share data with any of a plurality of output color devices. The color management system includes a networked connection space for input and output device communication, an input color profile for each input device, an output color profile for each output device, and an open color manager which links a given input device with a selected output device. When linking devices, an input color space dataset having black plus multiple color channels is parsed with the input and output color profiles at a job time to create an output color space dataset having black plus multiple color channels for imaging by the output device without degrading color accuracy while preserving black channel information. A method for open color management and an open color manager for use in an open color management system are also provided.

16 Claims, 5 Drawing Sheets

U.S. PATENT DOCUMENTS

| | | | |
|---|---|---|---|
| 6,643,029 B1 * | 11/2003 | Kumada et al. | 358/1.9 |
| 6,697,167 B1 * | 2/2004 | Takahashi | 358/1.9 |
| 6,707,573 B1 * | 3/2004 | Ito et al. | 358/1.9 |
| 6,775,030 B1 * | 8/2004 | Krabbenhoft et al. | 358/1.9 |
| 6,778,300 B1 * | 8/2004 | Kohler | 358/529 |
| 6,788,305 B1 * | 9/2004 | Ohga | 345/589 |
| 2002/0105660 A1 * | 8/2002 | Haikin | 358/1.9 |
| 2002/0161659 A1 * | 10/2002 | Veilleux et al. | 705/26 |

FOREIGN PATENT DOCUMENTS

| | | |
|---|---|---|
| EP | 1156668 | 11/2001 |
| WO | WO 01/24511 | 4/2001 |
| WO | WO0124511 | 4/2001 |

OTHER PUBLICATIONS

British Search Report dated Oct. 8, 2002.

* cited by examiner

COLOR SPACE TRANSFORMATION WITH BLACK PRESERVATION FOR OPEN COLOR MANAGEMENT

The present invention relates generally to printing mechanisms, such as inkjet and electrophotographic printers, and inkjet and electrophotographic plotters. More particularly the present invention relates to a method and system for preserving black color information during a color space transformation in an open printing system architecture.

The retina of the human eye contains cells which are sensitive to different wavelengths of light. In particular, these specialized cells are referred to as rods and cones. Rods are particularly sensitive in low-light conditions and therefore are responsible for the human scotopic or night vision. Cones are sensitive to more standard levels of light and are responsible for the human photopic or day vision. In particular, cones can be further divided into three types of cells which are each adapted to be particularly sensitive at individual and separate wavelengths. Namely, the three wavelengths which the human eye is responsive to are those corresponding to red, green, and blue light. In fact, the millions of distinguishable colors which humans are able to perceive are actually based on the varying levels of red, green, and blue light as integrated by the eye.

Additive color devices, such as computer monitors, televisions, and LCD screens take advantage of the human visual response to red, green, and blue light by utilizing clusters of pixels which are capable of emitting red, green, and blue (RGB) light in ways which effectively fool the human eye into perceiving a myriad of colors. The large gamut, or color space which these additive color devices are capable of producing only requires one set of RGB color values per pixel.

In addition to additive color devices, there are also subtractive color devices such as printers and plotters. While an additive color device utilizes active light source elements to emit RGB light, subtractive color devices rely on dyed or pigmented particles to absorb certain wavelengths and reflect or allow other wavelengths of light to pass through. An example of such a subtractive system can be found in a basic 3-color-ink inkjet printer. Such a printer would typically have cyan, magenta, and yellow (CMY) ink. The CMY inks are normally deposited on white paper which appears white because it reflects the full spectrum of light which is mixed and integrated by the eye as white. The subtractive process occurs when, for example, cyan ink is applied to the white paper. Cyan is the complement of red, absorbing all of the red light and reflecting or transmitting green and blue light. The human eye, when receiving equal amounts of green and blue light perceives the color cyan. Similarly, magenta is the complement of green, absorbing all of the green light and reflecting or transmitting red and blue light. Yellow is the complement of blue, absorbing all of the blue light and reflecting or transmitting red and green light.

Theoretically, a printing system could vary the concentrations of only three colors of ink: cyan (C), magenta (M), and yellow (Y) to produce any color. White can be obtained by putting no ink on the paper, and black can be obtained by putting cyan, magenta, and yellow on the paper together to block all light. In practice, however, the color obtained when using CMY inks together to make black may end up being brown. As a result, a true-black colorant is typically added to the subtractive color set. Such a four-color subtractive color set is referred to as a CMYK system for cyan (C), magenta (M), yellow (Y), and black (K).

A four-color printing system, such as a CMYK printer, has an output color gamut which is determined by factors which include the pixel size, the reflectance of the print media, the properties of the ink or toner, including whether dyes or pigments are used and the quantities of each, the differing volumes of each CMYK ink which are placed in a given pixel, and the accuracy of the colorant placement. Although a color printing system may not be able to reproduce the entire spectrum of colors which are humanly perceivable, a quality color printing system will be able to reproduce millions of colors, the boundaries of which are defined by the printer's color space or color gamut.

A printer's color gamut can be measured by generating print samples with varying amounts of CMYK inks and using a spectrophotometer to measure the amount of spectral light reflected from each sample. Since such measurements can be based on differing reference light values, standard methods for representing color information are commonly used which can remove system and viewing-condition dependent variables and therefore be correlated to any given measurement system. Two such color coordinate systems are the CIE L*a*b* system and the CIE XYZ system, both of which are device independent color spaces. The entire color space for a printer may then be plotted by using the measured values in an interpolation process.

The source of printable data associated with a printer is typically referred to as a host. A host can be a personal computer, laptop, PDA, digital camera or any data storage device designed to interface with the printer and pass data to it. The printable data exists in electronic format and may be created in several ways, including light capture from a digital camera or scanner, computer generation with imaging software, or computer capture from a graphics tablet. Depending on the method used to capture or create this digital imaging data, differing input color spaces may be used. For example, a digital camera may capture RGB data. A graphic artist using a digital tablet might prefer to create documents in a CMYK color space. A person using digital imaging software could be working with black and white, grayscale, or even a custom color pallet. Like the output device color space, each of these input color spaces may also be converted into a device independent color space such as CIE L*a*b* or CIE XYZ.

Input color space data is often specified in terms of CMYK in the graphics art environment, thereby affording the opportunity for direct manipulation of the black (K) data in the output. People in the graphic arts field would like to have control over the amount of black (K) ink used in the output for several reasons. First, black ink and black toner are respectively cheaper than color inks or toners. Therefore, using K to replace CMY reduces printing costs. Second, higher density can be achieved by using K instead of CMY, and therefore the tone range is typically greater in four-color printing systems than three-color printing systems. Additionally, in ink-based systems, there is a maximum amount of ink a given print media will absorb, so there is a practical limitation imposed on the amount of CMY ink which can be placed on a given location. Third, using K in place of CMY reduces the total ink coverage in inkjet systems allowing faster drying times. Fourth, using K in place of CMY reduces toner pile height in electrophotographic systems enabling more robust fusing.

Unfortunately, however, the open-loop two-step conversion from an input CMYK color space to a device independent color space such as L*a*b* and then to an output C'M'Y'K' color space results in loss of control over the K data. While an input set of CMYK values can result in only one set of L*a*b* values, converting from L*a*b* to an output set of C'M'Y'K' values (provided the input K was not equal to zero) results in a theoretically infinite number of C'M'Y'K' values which would perceptually have the same color, but which would have varying degrees of K', thereby removing the relationship between input K and output K' and the control thereof from the graphic artist.

For example, assume a color has been specified by the graphic artist as K=0, C=30%, M=40%, and Y=80%. This color could be transformed to L*a*b*, adjusted to match the printer L*a*b*, and then converted to an output C'M'Y'K'. The output C'M'Y'K', however, could be represented as [C',M',Y'K']=[0, 25, 45, 75] or [10, 15, 35, 65] or [4, 20, 40, 70], etc. As the K' value is increased, the C'M'Y' values are decreased by a nearly corresponding amount, each combination resulting in perceptually the same color. Given the indeterministic nature of this open-loop CMYK-to-L*a*b*-to-C'M'Y'K' conversion, an empirical or predetermined lookup table or tables are typically developed, instead, to effect the conversion. The use of such look-up tables when converting input color space data to output color space data is, by definition, a closed-loop color management system.

One closed-loop method to convert the input CMYK to an output C'M'Y'K' is by using four one-dimensional lookup tables. (One each for C, M, Y, and K). However, since a series of one-dimensional lookup tables cannot account for the interaction between different channels, the color transformation is not accurate. Another closed-loop method which attempts to compensate for the channel interaction is to use a three-dimensional CMY look-up table coupled with a one-dimensional K lookup table. In this method, the K-channel is ignored, and the CMY data is converted to C'M'Y' via the empirical three-dimensional lookup table. The input K data is then converted to an output K' data via some form of weighting factor in a one-dimensional look-up table. Unfortunately, however, this method ignores the interaction between the K channels and the CMY channels. A third closed-loop method is to build a four-dimensional lookup table using a printer color model (or multiple-dimensional interpolation) and gamut mapping. This approach is capable of preserving K-channel information as well as accounting for the interactions between all four of the CMYK channels. Unfortunately, however, several factors must be predetermined so that such a four-dimensional lookup table can be created. These factors include the input CMYK color space, the output CMYK color space, the gamut mapping method, and the black weight. As such, look-up table methods work only in a closed-loop color management system architecture where one host, using a predetermined color space will only be connected to one known printer. As color processing moves to a network-based open color architecture, such closed loop approaches do not fit into the workflow.

In an ideal open color management system, a virtually unlimited number of input color systems may be linked with any number of output systems. The users have the freedom to choose or define any input color space they would like to work with, and direct control may be influenced over the output levels of C'M'Y'K'. Graphic artists, in particular, have been asking for this capability.

Thus, it would be desirable to have a method and system for color space transformation with black preservation which works in the context of an open color management system.

SUMMARY OF THE INVENTION

According to one aspect of the present invention, an open color management system allowing any of a plurality of input color devices to share data with any of a plurality of output color devices is provided. The open color management system includes a networked connection space for input and output device communication, an input color profile for each input device, an output color profile for each output device, and an open color manager which links a given input device with a selected output device. When linking the given input device with a selected output device, an input color space dataset having black plus multiple color channels is parsed with the input and output color profiles at a job time to create an output color space dataset having black plus multiple color channels for imaging by the output device without degrading color accuracy while preserving black channel information.

According to another aspect of the present invention, a method is provided for open color management allowing any of a plurality of input color devices to share data with any of a plurality of output color devices. The method includes connecting the input devices and the output devices to a network space to allow communication. The method also includes initiating contact with a selected output device by a given input device. The method further includes linking an input color profile with an output color profile at a job-time to effect real-time gamut mapping and color space conversion. The method further includes processing an input color data set, having black plus multiple color channels, through the real-time gamut mapping and color space conversion while preserving black channel information. The method also includes passing accurate output color data with preserved black channel levels to said selected output color device.

According to a further aspect of the present invention, an open color manager for use in an open color management system is provided. The open color manager includes a processing means for transforming an input color space dataset to a profile connection space while maintaining input black information. The open color manager also includes a processing means for comparing, in the profile connection space, an input gamut surface data set with an output gamut surface data set to determine a gamut mapping function and a black mapping function. The open color manager optionally includes a processing means for applying an output ink limit data set to the gamut mapping function to optimize the gamut mapping function. The open color manager further includes a processing means for applying the black mapping function to the input black information to determine output black information, thereby enabling direct control of the output black information by adjusting the input black information. The open color manager also includes a processing means for adjusting the profile connection space data, associated with the input color space dataset, to a gamut-adjusted profile connection space data by applying the gamut mapping function. The open color manager further includes a processing means for converting the gamut-adjusted profile connection space data to an output color space dataset by applying an associated output lookup table from an associated output color profile data structure in conjunction with the output black information.

DETAILED DESCRIPTION OF THE PREFERRED EMBODIMENTS

Figure 1:
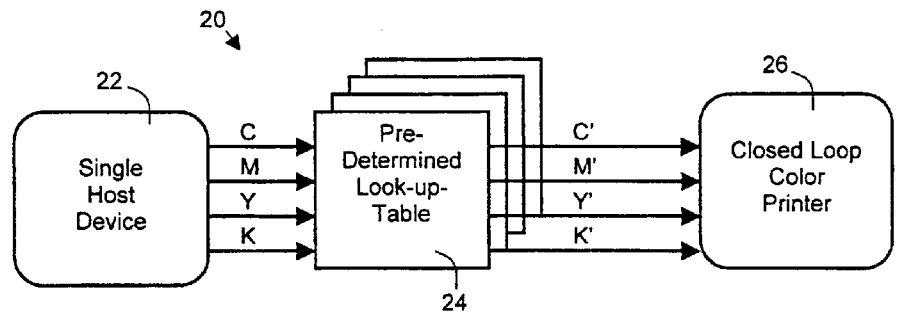
FIG. 1 is a block diagram of a closed-loop color management system.

FIG. 1 illustrates a closed-loop color management system 20, consisting of a single host device 22, here shown capable of sending color data using the CMYK color space. A predetermined lookup table 24 is then used to convert the input CMYK data to output C'M'Y'K' data which is compatible with closed-loop color printer 26. As described above, the pre-determined lookup table 24 is adequate only for a closed-loop color management system 20.

Figure 2:
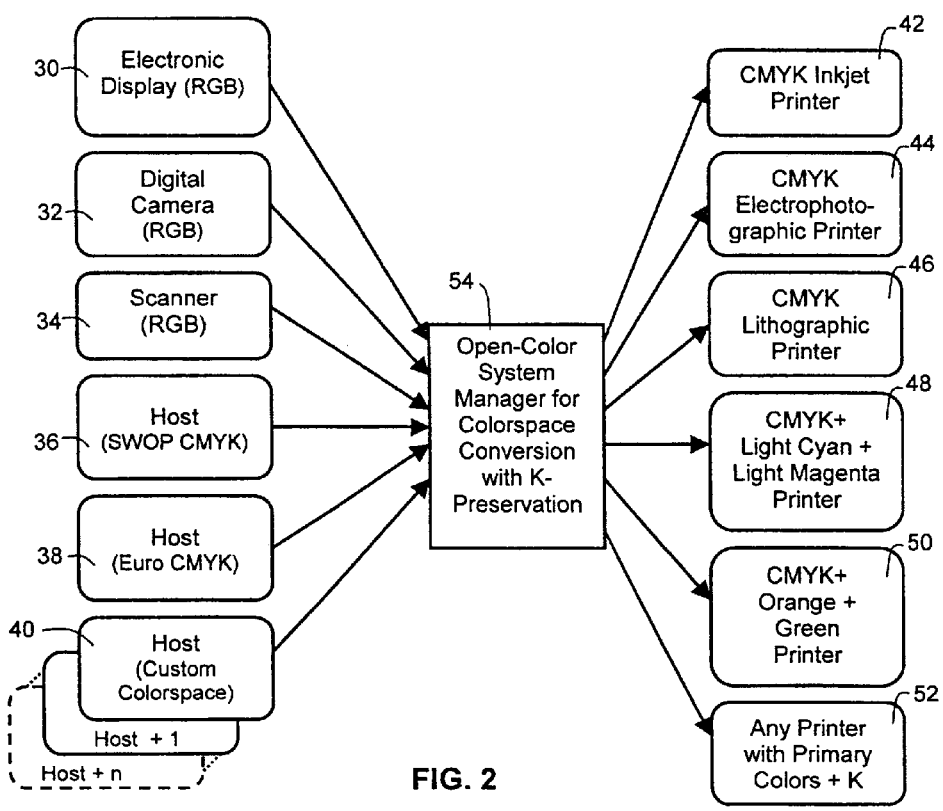
FIG. 2 is a block diagram of an open color management system model.

FIG. 2 illustrates an open color management system 28. Various types of host devices may operate in the open color management system 28, such as electronic display 30, digital camera 32, scanner 34, SWOP (Specifications Web Offset Publications) CMYK Host 36, Euro CMYK Host 38, and any number of custom color space hosts 40. Each of the host devices has its own color space. For example electronic display 30 may use the sRGB color space, while digital camera 32 and scanner 34 may use a non-standard RGB color space. Hosts 36 and 38 each use different standard forms of the CMYK color space, namely SWOP CMYK which is prevalent in the United States and Euro CMYK which is prevalent outside the United States. It is actually desirable to allow a host to use any input color space within the open color management system 28. Other types of color spaces may be standards recognized by various organizations, or the color spaces may be a custom color space created by a graphic artist for a special application, as illustrated by custom color-space host 40.

Various types of output devices may also operate in the open color management system, such as CMYK inkjet printer 42, CMYK electrophotographic printer 44, and CMYK lithographic printer 46. A larger printable color gamut, and therefore possibly higher print quality may be obtained by using more than the CMYK primary colors in a printer. For example, CMYK+light cyan+light magenta printer 48 and CMYK+orange+green printer 50 may also be a part of the open color management system 28. In fact, a printer with any combination of primary colors plus black (K) 52 may preferably operate in the open color management system 28.

The hosts 30–40 and printers 42–52 of the open color management system 28 are linked together at job-time by open color manager 54. The open color manager 54 may reside on the host side, the printer side, both sides, or in a remote location. In the open color management system 28 any host may print to any printer without the need for a predetermined look-up table 24. When linking a given host to a given printer, the open color manager 54 also is able to preserve K information to satisfy the desire of people in the graphic arts field to control K levels in the output while simultaneously offering a wide flexibility in connectivity.

Figure 3:
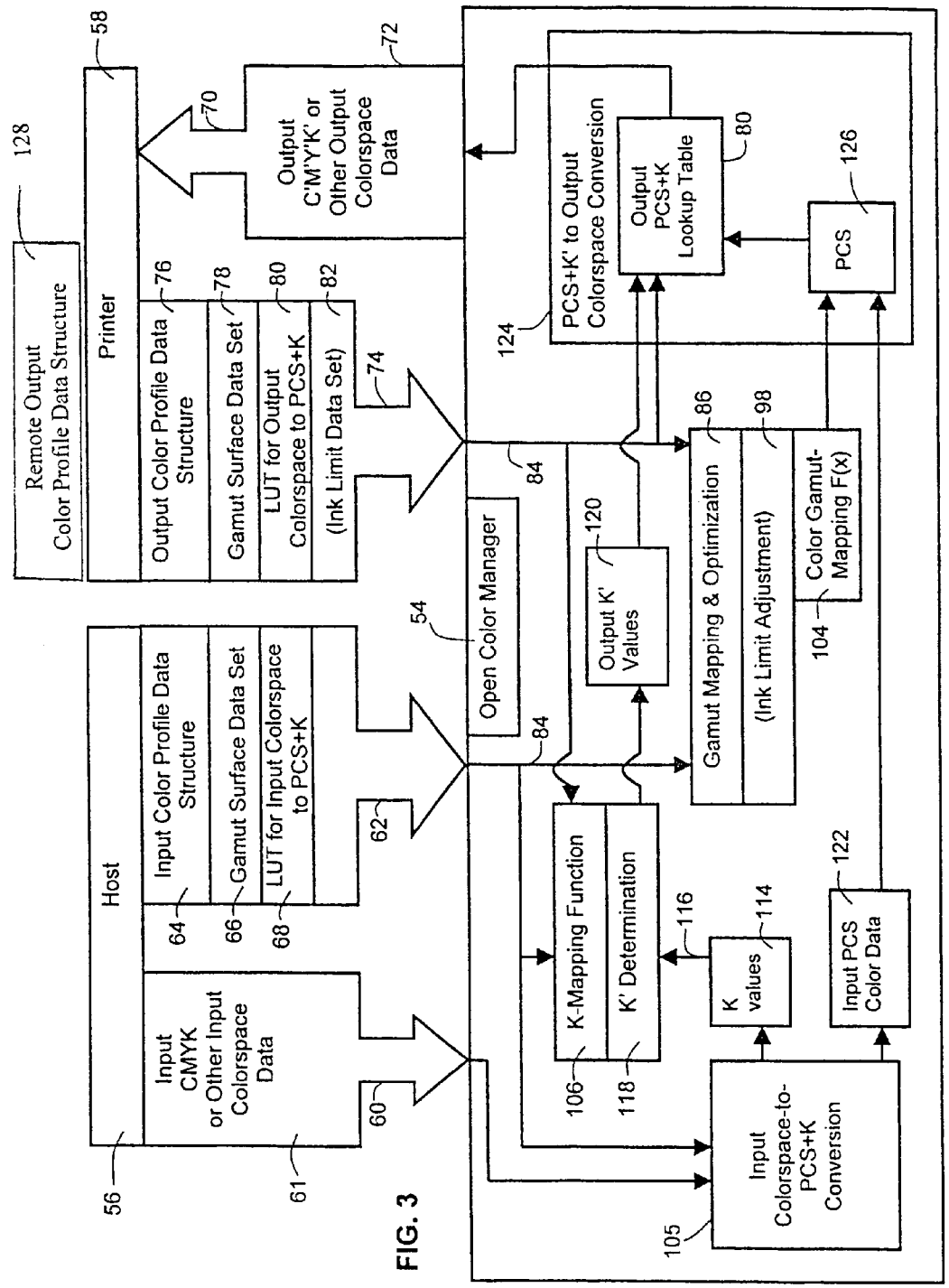
FIG. 3 is a block diagram of a host and a printer interfacing with an open color manager which is performing color space transformations with K-preservation.

FIG. 3 illustrates a host 56 and a printer 58 interfacing with the open color manager 54 in the context of the open color management system 28. The host 56 may be any type of digital device which is capable of sending color data. The host 56 transfers 60 the input color space data 61 to the open color manager 54. For convenience, the input color data 61 will be described as CMYK data, but any other input color space is applicable, such as, for example, sRGB, RGB, SWOP CMYK, Euro CMYK, or a custom color space. The host 56 also transfers 62 an input color profile data structure 64 to the open color manager 54. The input color profile data structure 64 includes a host gamut surface data set 66 and a look-up-table 68 (LUT) to convert the input color space to a profile connection space (PCS) with K data. The PCS is preferably a device-independent color space such as CIE L*a*b*, CIE XYZ, or CIE CAM97s Jab. Such device independent color spaces are well-known by those skilled in the art. The input CMYK-to-PCS+K lookup table 68 maintains the K data intact even after the CMYK data has been converted to PCS.

The printer 58 may be any type of printer capable of printing color data. Printer 58 receives 70 output color space data 72 from the open color manager 54. For convenience, the output color data 72 will be described as C'M'Y'K' data, but other output color spaces are applicable, such as, for example, C'M'Y'K'+Light Cyan+Light Magenta, C'M'Y'K'+green+orange, or any other C'M'Y'K'+other primary output color space. In the embodiment of FIG. 3, the printer 58 is also sharing 74 an output color profile data structure 76 with the open color manager 54. The output color profile data structure 76 includes a printer gamut surface data set 78, a look-up-table 80 (LUT) to convert between the output color space C'M'Y'K' and PCS+K', and an optional ink limit data set 82.

Figure 4:
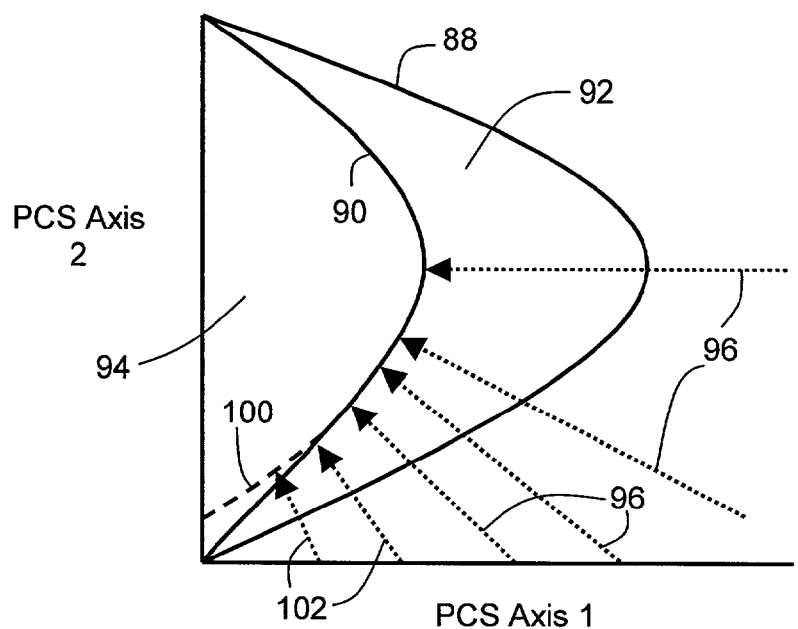
FIG. 4 is graph of an input color gamut surface and an output color gamut surface illustrating the gamut mapping process.

Inside the open color manager, 54, the host gamut surface data set 66 and the printer gamut surface data set 78 are passed 84 to a gamut mapping and optimization step 86. Each gamut surface data set 66, 78 defines the outer boundaries of the host 56 and printer 58 color capabilities, respectively. The gamut surface data sets 66,78 are provided in profile connection space (PCS) coordinates. A typical PCS will have three dimensions, and a device gamut surface map defines a three dimensional color space body. A two-dimensional slice of such a three-dimensional gamut map is shown in FIG. 4. Host gamut surface curve 88 is plotted with printer gamut surface curve 90. The area to the left of each gamut surface curve 88, 90 defines the actual color gamut of each device. In this example, the host color gamut 92 is larger than the printer color gamut 94. Thus in this example, the printer 58 will not be able to accurately reproduce colors to the right of the printer gamut surface curve 90. To compensate, the open color manager 54 performs gamut mapping and optimization based on the gamut volume/data defined by surfaces 88, 90. In the example of FIG. 4, the host color gamut 92 must be compressed and the hue rotation must be applied so that the full printer gamut 94 will be used and proper hue adjustment is performed for saturation mapping. Such gamut mapping techniques are well known to those skilled in the art. Arrows 96 illustrate an example of how the host gamut 92 might be mapped to the printer gamut 94 on the surface of both curves. A similar mapping must be performed between the entire gamut volumes 92,94.

As part of the gamut mapping and optimization step 86, an optional ink limit adjustment step 98 may be performed by the open color manager 54. Although certain high concentrations of ink may theoretically enable a larger printer color gamut 94, there may be other factors, such as paper cockle (rippling of a print media when saturated) and ink dry-time which would make such high concentrations of ink undesirable. In such cases, an optional ink limit data set 82 is provided 84 to the gamut mapping and optimization step 86 inside of the open color manager 54 for the purpose of ink limit adjustment 98. The ink limit data set 82 is used to shift the printer gamut surface curve 90 to an adjusted printer gamut surface curve 100. Arrows 102 illustrate an example of how the host gamut surface 88 might be mapped to the adjusted printer gamut surface 100 in light of the optional ink limit adjustment step 98. The relationship between the host color gamut 92 and the printer color gamut 94, determined by the open color manager 54 is referred to as a color gamut mapping function 104.

Following the gamut mapping and optimization step 86, the open color manager 54 converts 105 the input color space data 61, here CMYK data into PCS+K data using the host-provided look-up table 68 for CMYK-to-PCS+K. This input color space data conversion to PCS+K 105 may optionally be performed prior-to or after the gamut mapping & optimization step 86 and optional ink limit adjustment step 98. The profile connection space (PCS) portion of the color data is now compatible with color gamut mapping function 104 determined by the gamut mapping and optimization step 98.

Figure 5:
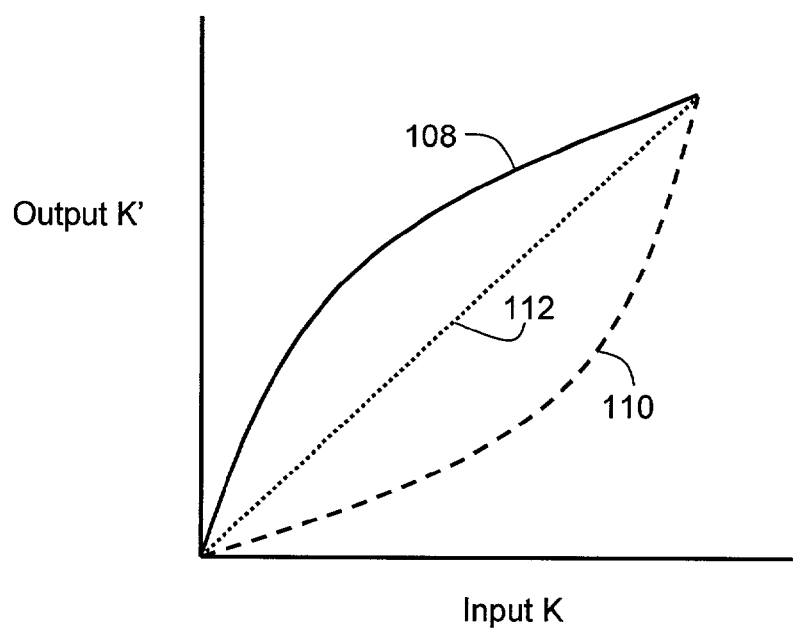
FIG. 5 is a graph illustrating possible examples of the relationship between input K and output K.

The host and printer look-up tables for color space-to-PCS+K conversion 68, 80 also contain information regarding input K and output K' in terms of the PCS. Provided both the host 56 and the printer 58 in any given host/printer combination of the open color management system 28 are capable of managing K data separately from color data, an additional function will be calculated by the open color manager 54. This additional function is called the K-mapping function 106, and it quantifies the relationship between input K and output K'. By comparing input K lightness information with output K' lightness information in terms of the PCS, the K-mapping function 106 can also be computed at a job-time by the open color manager 54. FIG. 5 illustrates three examples of K-mapping functions. In some cases, the input K is boosted 108 to a higher output K' to give the same lightness. In other cases, the input K is reduced 110 to a lower output K' to give the same lightness. In rare cases, the input K to output K relationship can be one-to-one 112. In any case, the end result is the calculation of K-mapping function 106 which quantifies the relationship between input K and output K'.

After the K-mapping function 106 has been calculated and the input color space-to-PCS+K conversion has taken place, an output K' determination step is performed. The input K values 114 from the PCS+K data are sent 116 to the K' determination step 118 along with the K-mapping function 106. The input K values 114 are processed though the K-mapping function 106 to produce output K' values 120.

At this point, the input PCS color data 122 from the input color space to PCS+K conversion step 105 is used in conjunction with the output K' values 120 in a PCS+K' to output color space conversion 124. The PCS+K' to output color space conversion 124 occurs in two steps. First, the color gamut mapping function 104 from the gamut mapping and optimization step 86 and the optional ink limit adjustment step 98 are used to map the input PCS color data 122 to an output-compatible PCS' data set 126. Second, the gamut-corrected output PCS' color data set 126 and their corresponding output K' values 120 are processed against the output color space to PCS+K look-up table 80 to determine perceptually accurate output C'M'Y'K' color data 72 which is then communicated 70 by the open color manager 54 with printer 58.

Figure 6:
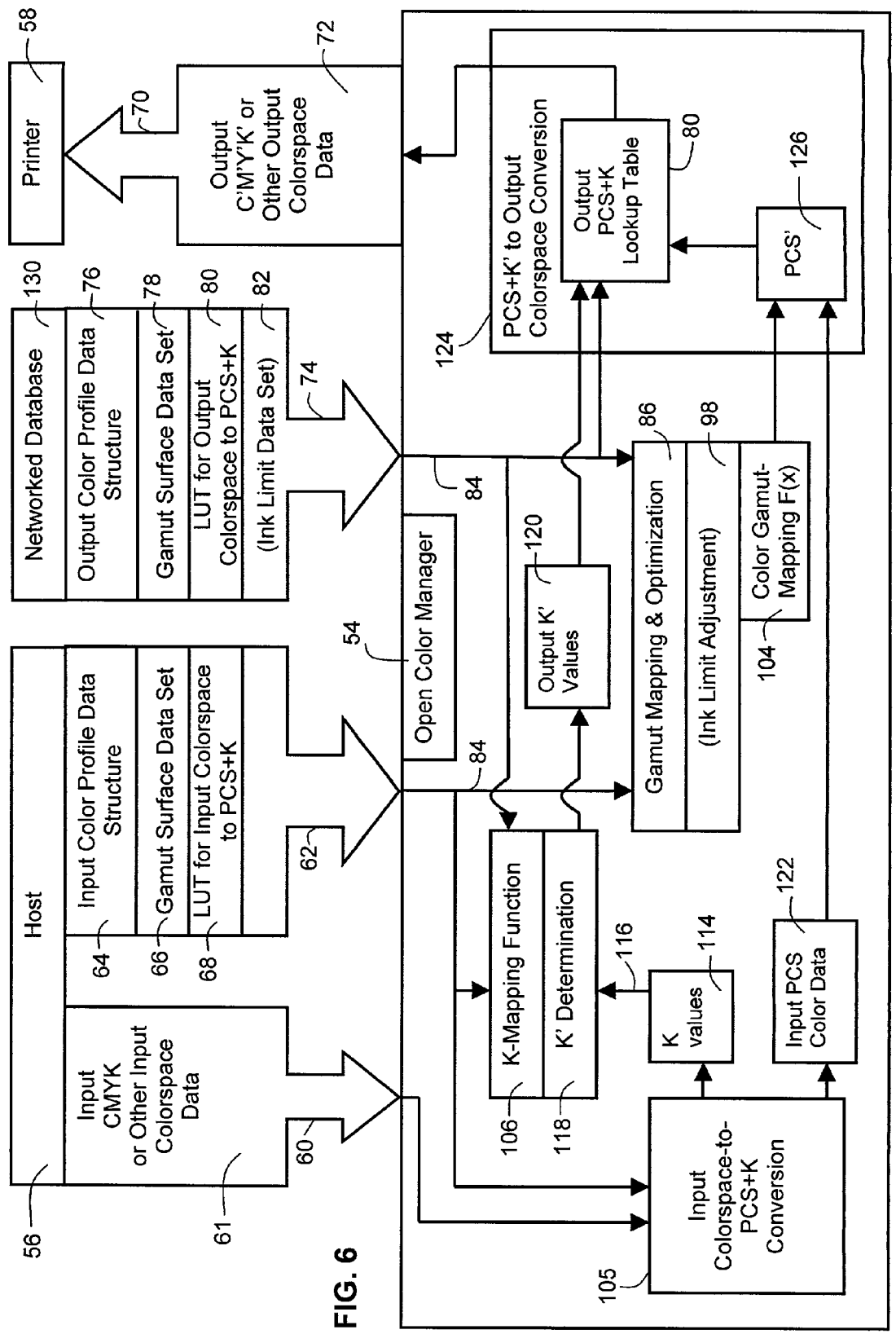
FIG. 6 is a block diagram of a host, a networked database, and printer interfacing with an open color manager which is performing color space transformations with K-preservation.

FIG. 6 illustrates a variation on the open color management process of FIG. 3. The process in FIG. 6 is identical to the process of FIG. 3, except for the source of the output color profile data structure. In the system of FIG. 3, the output color profile data structure 76 resides in the printer 58 and is passed to the open color manager 54 at job time by the printer 58. Due to printer memory limitations, communication limitations, or service and upgrade considerations, it may be desirable to have a remote output color profile data structure 128 stored on a networked database 130. In this alternative embodiment, the networked database 130 provides the open color manager 54 with the remote output color profile data structure 128 based on the printer 58 requested by the host 56 at job-time.

The open color system embodiments of FIGS. 3 and 6 result in output C'M'Y'K' data 72 which has K' values that accurately reflect the intended input K value. Ideally, the output K' value will be an identical match to the intended input K value in terms of the K lightness. However, calculation errors such as rounding or interpolation errors may result in an output K' value which is substantially preserved, though not identical. The important feature of the black preservation is that the relative relationship between the input K and the output K' is not lost. The C'M'Y' values are adjusted based on the substantially accurate K' value to result in perceptually the same output color. Additionally, this color transformation process is performed in an open color management system 28 where the input host 56 and the output printer 58 know nothing about each other prior to job-time. Instead, profile color data structures 64 and 76 are linked real-time by the open color manager 54.

Figure 7:
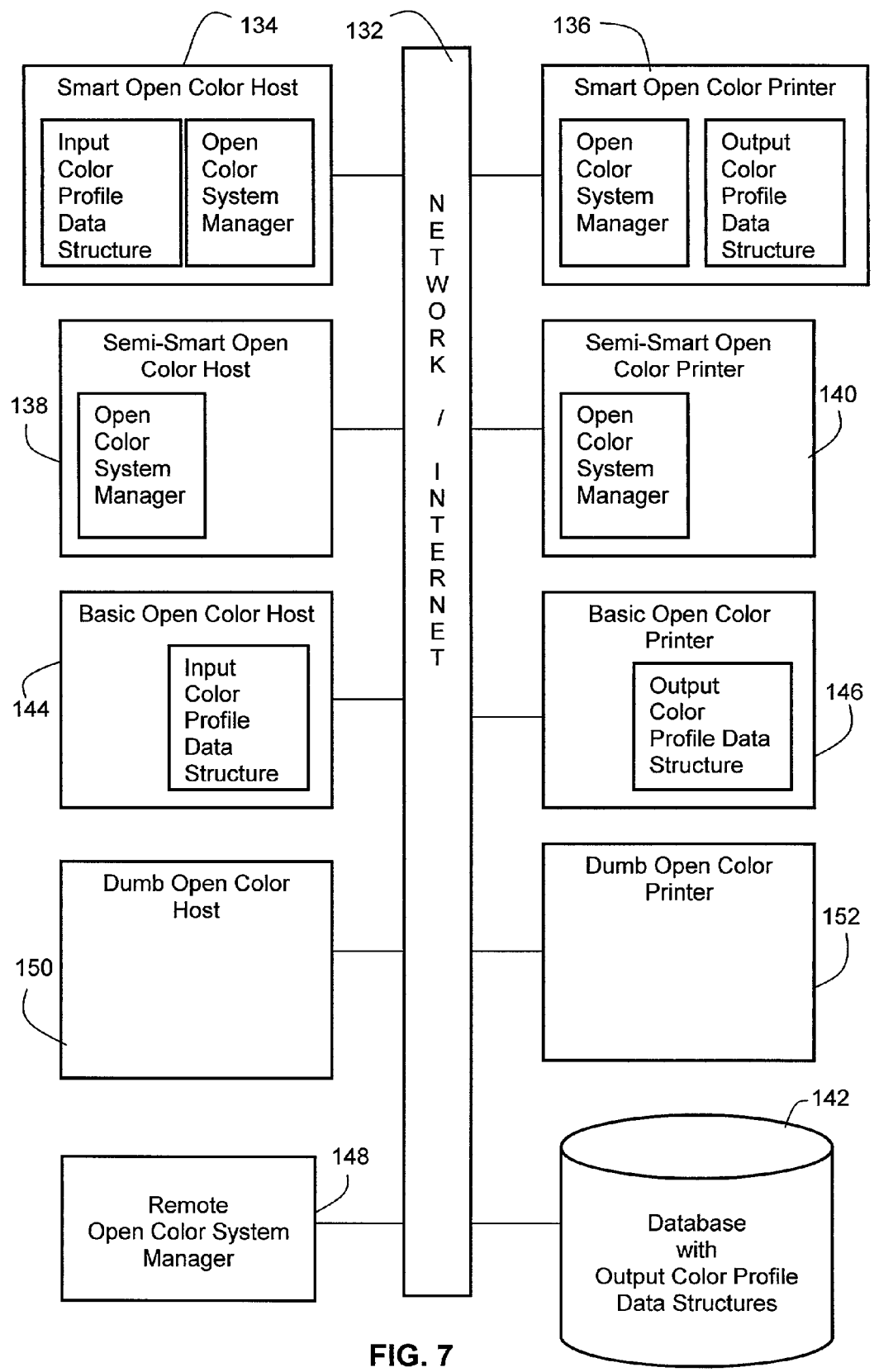
FIG. 7 is a block diagram illustrating how different types of hosts, printers, and network resources may utilize open color system management techniques.

Up to this point, the functionality of the open color manager 54 has been detailed, but the location of the color manager 54 has not been specified. Due to the open color system architecture, there is great flexibility in where the open color manager 54 may be implemented. FIG. 7 illustrates the possible locations for the open color manager 54. The open color management system 28 is made possible because a plurality of hosts may be flexibly connected to a plurality of printers via the Internet or other network means, such as a WAN, LAN, Ethernet, Intranet, or wireless network. This internet or network 132 is illustrated in FIG. 7. The open color management system 28 as described in the preceding embodiments is flexible enough to handle four major classes of hosts and printers. All hosts and printers should fall into one of these four classes, and all hosts and printers are capable of connecting to the network/internet 132 per the definition of the open color management system 28.

As shown in FIG. 7, the first class consists of smart open color hosts 134 and smart open color printers 136. These smart open color devices 134, 136 each contain an open color manager 54 and their respective input or output color profile data structures. The second class consists of semi-smart open color hosts 138 and semi-smart open color printers 140. These semi-smart open color devices 138, 140 each contain an open color manager 54, but do not store their respective input or output color profile data structures locally. Instead, the input and output color data structures may be stored in a remote database 142 which is also connected to the network/internet 132 and retrievable by any given open color manager 54 at job time. The third class consists of basic open color hosts 144 and basic open color printers 146. These basic open color devices 144, 146 each contain a respective input or output color profile data structure, but do not include a on-board open color manager 54. Instead, these basic open color printers rely either on a remote open color manager 148 which is connected to the network/internet 132 or the open color manager 54 resident in a smart or semi-smart printer or host being linked to at job time. The fourth class consists of dumb open color hosts 150 and dumb open color printers 152. These dumb open color devices 150, 152 contain neither a local color profile data structure nor a local open color manager 54. They simply connect to the network, and at job time, they work in conjunction with the remote open color manager 148 and the remote database 142 which stores input and output color profile data structures. The dumb open color devices may also rely on the open color manager 54 of a smarter corresponding device linked-to at job-time.

The open color manager 54 may be implemented using a variety of different data processing methods, but the actual location of the open color manager, whether it be on a host, on a printer, or in a remote location, will determine the preferred implementation. When the open color manager 54 is located onboard a printer, the preferred way of implementing the open color manager 54 is with an ASIC, via a firmware instruction set running on a microprocessor, or with a combination of an ASIC and firmware running on a microprocessor. When the open color manager 54 is located on a host, the preferred method of implementation is either with firmware running on a microprocessor or with software running on an operating system. The remote open color manager 148 is preferably software based, running on a server computer.

Thus, the method and system for open color space transformation with black preservation enables a networked/internet based approach to allow any host to print to any printer. The host and the printer do not need to know anything about each other. At job time, the host and printer pass their respective input and output color profile data structures to an open color manager. If such a color profile data structure is not native to the host or printer, it may be retrieved from a remote database which stores such structures. The open color manager may reside and run from either the host ,the printer, or a remote location if neither the host nor the printer are programmed to implement an open color manager. The open color manager links the color profile data structures from both the host and the printer, performs gamut mapping and optimization, performs optional ink limit adjustment, converts the input color space data to a profile connection space (preferably a device independent color space), determines an output black (K') value based on the input black (K) value in order to preserve the black level, and then uses the determined gamut mapping and optimization information in conjunction with the input PCS color data and the output black (K') data to complete a conversion of the input color or space data to an output color space data where the black information has been preserved without degrading the color accuracy. The entire process performed by the open color manager is performed at job time, so the host and the printer remain separate and independent from each other.

It is apparent that a variety of other modifications and substitutions may be made to implement a color space transformation with black preservation for an open color management system while still falling within the scope of the claims below.

I claim:

1. An open color management system allowing any of a plurality of input color devices to share data with any of a plurality of output color devices comprising:
   a networked connection space for input and output device communication;
   an input color profile for each input device;
   an output color profile for each output device; and
   an open color manager, which resides on a given input device, to link said given input device with a selected output device, including a configuration to parse an input color space data set comprising black channel data plus multiple color channel data with the input and output color profiles at a job time to create a profile connection space including transformed multiple color channels plus the input black channel data to provide an output color space data set comprising the input black channel data plus the transformed multiple color channels for imaging by said selected output device while substantially preserving the input black channel data; and
   wherein said input color profile is provided by a device selected from the group including:
      said given input device; and
      a remote database; and
   wherein said output color profile is provided by a device selected from the group including:
      said selected output device; and
      a remote database.

2. An open color management system as in claim 1 wherein said input color space dataset is further selected from the group consisting of CMYK, SWOP CMYK, and Euro CMYK.

3. An open color management system as in claim 1 wherein said output color space dataset is further selected from the group consisting of CMYK, CMYK-plus-light magenta-plus-light cyan, and CMYK-plus-orange-plus green.

4. An open color management system as in claim 1 wherein:
   said given input device is selected from the group consisting of electronic displays, digital cameras, scanners, personal computers, laptops, hand-held computers, and graphic arts software running on a processor; and
   said selected output device is selected from the group consisting of inkjet printers, electrophotographic printers, and lithographic printers.

5. An open color management system as in claim 1, wherein said input color profile further comprises:
   an input gamut surface data set; and
   an input look-up table for conversion from said input color space dataset to a profile connection space while preserving any input black information.

6. An open color management system as in claim 5, wherein said output color profile further comprises:
   an output gamut surface data set;
   an output look-up table for conversion from said output color space dataset to said profile connection space while preserving any output black information; and
   optionally, an output ink limit dataset to be used in conjunction with said output gamut surface data set.

7. An open color management system as in claim 6, wherein said open color manager further comprises:
   a processing means for transforming said input color space dataset to said profile connection space and said input black information;

a processing means for comparing, in said profile connection space, said input gamut surface data set with said output gamut surface data set to determine a gamut mapping function and a black mapping function;

an optional processing means for applying said optional output ink limit data set to said gamut mapping function to optimize said gamut mapping function;

a processing means for applying said black mapping function to said input black information to determine said output black information, thereby enabling direct control of said output black information by adjusting said input black information;

a processing means for adjusting said profile connection space data from said given input device to said selected output device by applying said gamut mapping function; and a processing means for converting said gamut-adjusted profile connection space data to said output color space dataset by applying said output lookup table from said output color profile in conjunction with said output black information.

8. An open color management system as in claim 7, wherein said profile connection space is CIE L*a*b.

9. An open color management system as in claim 7, wherein said profile connection space is CIE XYZ.

10. An open color management system as in claim 7, wherein said profile connection space is CIE CAM97 Jab.

11. An open color management system as in claim 7 wherein said input color space dataset is further selected from the group consisting of CMYK, SWOP CMYK, and Euro CMYK.

12. An open color management system as in claim 7 wherein said output color space dataset is further selected from the group consisting of CMYK, CMYK-plus-light magenta-plus-light cyan, and CMYK-plus-orange-plus green.

13. An open color management system as in claim 7 wherein:
said given input device is selected from the group consisting of electronic displays, digital cameras, scanners, personal computers, laptops, hand-held computers, and graphic arts software running on a processor; and
said selected output device is selected from the group consisting of inkjet printers, electrophotographic printers, and lithographic printers.

14. A method for open color management comprising:
connecting a plurality of input devices and a plurality of output devices to a network space;
initiating contact with a selected output device by a given input device;
linking an input color profile with an output color profile over the network space;
processing an input color data set comprising black plus multiple color channels through a real-time gamut mapping and color space conversion while substantially preserving black channel information; and
passing output color data with substantially preserved black channel levels to said selected output color device.

15. An open color management system allowing any of a plurality of input color devices to share data with any of a plurality of output color devices comprising:
a networked connection space for input and output device communication;
an input color profile for each input device;
an output color profile for each output device; and
an open color manager, which resides on a selected output device, to link a given input device with said selected output device, including a configuration to parse an input color space data set comprising black channel data plus multiple color channel data with the input and output color profiles at a job time to create a profile connection space including transformed multiple color channels plus the input black channel data to provide an output color space data set comprising the input black channel data plus the transformed multiple color channels for imaging by said selected output device while substantially preserving the input black channel data; and
wherein said input color profile is provided by a device selected from the group including:
said given input device; and
a remote database; and
wherein said output color profile is provided by a device selected from the group including:
said selected output device; and
a remote database.

16. An open color management system allowing any of a plurality of input color devices to share data with any of a plurality of output color devices comprising:
a networked connection space for input and output device communication;
an input color profile for each input device;
an output color profile for each output device; and
an open color manager, which resides on a remote processing device, to link a given input device with a selected output device, including a configuration to parse an input color space data set comprising black channel data plus multiple color channel data with the input and output color profiles at a job time to create a profile connection space including transformed multiple color channels plus the input black channel data to provide an output color space data set comprising the input black channel data plus the transformed multiple color channels for imaging by said selected output device while substantially preserving the input black channel data; and
wherein said input color profile is provided by a device selected from the group including:
said given input device; and
a remote database; and
wherein said output color profile is provided by a device selected from the group including:
said selected output device; and
said remote database.

* * * * *